(12) United States Patent
Ota

(10) Patent No.: US 12,179,762 B2
(45) Date of Patent: Dec. 31, 2024

(54) VEHICLE CONTROL DEVICE, VEHICLE CONTROL METHOD, AND PROGRAM

(71) Applicant: HITACHI ASTEMO, LTD., Hitachinaka (JP)

(72) Inventor: Hiroki Ota, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 207 days.

(21) Appl. No.: 17/794,890

(22) PCT Filed: Dec. 15, 2020

(86) PCT No.: PCT/JP2020/046666
§ 371 (c)(1),
(2) Date: Jul. 22, 2022

(87) PCT Pub. No.: WO2021/153051
PCT Pub. Date: Aug. 5, 2021

(65) Prior Publication Data
US 2023/0109372 A1 Apr. 6, 2023

(30) Foreign Application Priority Data

Jan. 29, 2020 (JP) ................. 2020-012631

(51) Int. Cl.
*B60W 30/18* (2012.01)
*B60W 10/18* (2012.01)
(Continued)

(52) U.S. Cl.
CPC .......... *B60W 30/181* (2013.01); *B60W 10/18* (2013.01); *B60W 60/001* (2020.02); *B60W 2420/403* (2013.01); *B60W 2552/00* (2020.02)

(58) Field of Classification Search
CPC .......................... B60W 30/181; B60W 50/029
See application file for complete search history.

(56) References Cited

U.S. PATENT DOCUMENTS

| 10,338,594 B2 * | 7/2019 | Long ............... G05D 1/0246 |
| 2018/0012088 A1 | 1/2018 | Matsuo |

(Continued)

FOREIGN PATENT DOCUMENTS

| JP | 2004-295597 A | 10/2004 |
| JP | 2007-118880 A | 5/2007 |

(Continued)

OTHER PUBLICATIONS

International Search Report with English Translation and Written Opinion for international application No. PCT/JP2020/046666 mailed Apr. 6, 2021.

*Primary Examiner* — Long T Tran
(74) *Attorney, Agent, or Firm* — Foley & Lardner LLP

(57) ABSTRACT

Provided is a vehicle control apparatus capable of preventing sudden deceleration of a vehicle to be controlled even in a case of failure to recognize a step condition at a predetermined position. The vehicle control apparatus 140 is mounted on the vehicle. The vehicle control apparatus 140 includes a position acquisition unit F1 configured to acquire a position of the vehicle, a route acquisition unit F2 configured to acquire a planned route of the vehicle, a recognition unit F3 configured to recognize a stop condition included in image data Dg from an imaging device, a range setting unit F4 configured to set a recognizable range for the stop condition in the planned route, a speed calculation unit F5 configured to calculate a braking speed of the vehicle, the braking speed allowing the vehicle to stop at a stop position corresponding to the stop condition without an acceleration of the vehicle during deceleration exceeding a set value, and a traveling control unit F6 configured to control a speed of the vehicle to the braking speed when the position of the vehicle is included in the recognizable range and the recognition unit fails to recognize the stop condition.

9 Claims, 5 Drawing Sheets

(51) Int. Cl.
  *B60W 50/02* (2012.01)
  *B60W 60/00* (2020.01)

(56) References Cited

U.S. PATENT DOCUMENTS

| | | | |
|---|---|---|---|
| 2018/0052463 A1* | 2/2018 | Mays | G07C 5/0808 |
| 2018/0345963 A1* | 12/2018 | Maura | B60W 60/0011 |
| 2019/0381999 A1* | 12/2019 | Yu | B60W 60/0015 |
| 2020/0012280 A1* | 1/2020 | Lin | G05D 1/0276 |
| 2020/0026935 A1 | 1/2020 | Hiyashi et al. | |
| 2020/0114916 A1 | 4/2020 | Oguro et al. | |
| 2020/0231142 A1* | 7/2020 | Liu | G01S 13/931 |
| 2020/0233418 A1* | 7/2020 | Liu | G05D 1/0212 |
| 2020/0307600 A1* | 10/2020 | Sato | G08G 1/167 |
| 2020/0391765 A1* | 12/2020 | Jia | B60W 60/001 |
| 2020/0406907 A1* | 12/2020 | Omari | G07C 5/008 |
| 2021/0053566 A1 | 2/2021 | Kobayashi et al. | |
| 2021/0094575 A1* | 4/2021 | Sato | B60W 30/16 |

FOREIGN PATENT DOCUMENTS

| | | |
|---|---|---|
| JP | 2007-309670 A | 11/2007 |
| JP | 2008-186265 A | 8/2008 |
| JP | 2019-121307 A | 7/2019 |
| WO | WO 2016/006029 A1 | 1/2016 |
| WO | WO 2018/066024 A1 | 4/2018 |
| WO | WO 2019/022201 A1 | 1/2019 |

* cited by examiner

VEHICLE CONTROL DEVICE, VEHICLE CONTROL METHOD, AND PROGRAM

TECHNICAL FIELD

The present disclosure relates to a vehicle control apparatus, a vehicle control method, or a program.

BACKGROUND ART

Conventionally, an invention related to an on-vehicle control device has been known (see PTL 1 below). This conventional device is an on-vehicle control device configured to control a traveling speed of a vehicle including the on-vehicle control device, and includes an acquisition unit, a calculation unit, and a control unit (see abstract, claim 1, paragraph 0004, etc. of the literature). The acquisition unit acquires a present light color of a traffic light unit installed at an intersection. The calculation unit calculates an avoidance position and an avoidance speed with respect to a dilemma zone at a time when yellow light starts.

The control unit executes a first deceleration process of reducing the traveling speed of the vehicle at the avoidance position to a speed equal to or lower than the avoidance speed, in a case where a present position of the vehicle is on an upstream side relative to the avoidance position and the present light color is green. With this configuration, it is possible to prevent the vehicle from entering a dilemma zone where the vehicle can neither normally stop nor pass through (see paragraphs 0012, 0067, etc. of the literature).

CITATION LIST

Patent Literature

PTL 1: WO 2019/022201 A

SUMMARY OF INVENTION

Technical Problem

As in the conventional on-vehicle control device, just controlling the traveling speed of the vehicle based on only the present position of the vehicle and the present light color may result in a need for sudden deceleration of the vehicle in a case of failure to recognize a stop condition such as a light color or a traffic light at a predetermined position.

The present disclosure provides a vehicle control apparatus, a vehicle control method, or a program capable of preventing sudden deceleration of a vehicle to be controlled even in the case of failure to recognize a stop condition at a predetermined position.

Solution to Problem

An aspect the present disclosure is a vehicle control apparatus mounted on a vehicle including an imaging device, the vehicle control apparatus including a position acquisition unit configured to acquire a position of the vehicle, a route acquisition unit configured to acquire a planned route of the vehicle, a recognition unit configured to recognize a stop condition included in image data from the imaging device, a range setting unit configured to set a recognizable range for the stop condition in the planned route, a speed calculation unit configured to calculate a braking speed of the vehicle, the braking speed allowing the vehicle to stop at a stop position corresponding to the stop condition without an acceleration of the vehicle during deceleration exceeding a set value, and a traveling control unit configured to control a speed of the vehicle to the braking speed when the position of the vehicle is included in the recognizable range and the recognition unit fails to recognize the stop condition.

Advantageous Effects of Invention

According to the aspect of the present disclosure, it is possible to provide a vehicle control apparatus capable of preventing sudden deceleration of a vehicle to be controlled even in the case of failure to recognize a stop condition at a predetermined position.

DESCRIPTION OF EMBODIMENTS

Hereinafter, an embodiment of a vehicle control apparatus according to the present disclosure will be described with reference to the drawings.

Figure 1:
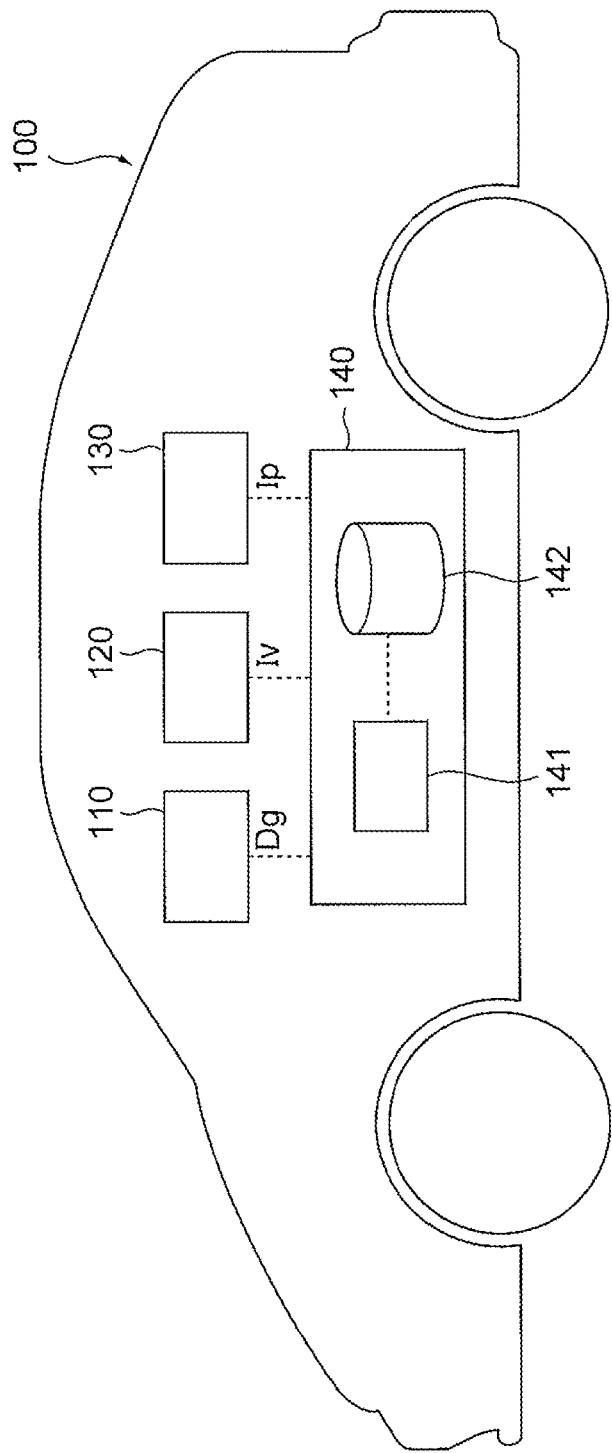
FIG. 1 is a schematic configuration diagram illustrating an embodiment of a vehicle control apparatus according to the present disclosure.

FIG. 1 is a schematic configuration diagram illustrating an embodiment of a vehicle control apparatus according to the present disclosure. A vehicle 100 is, for example, a self-driving vehicle or a vehicle equipped with an advanced driver assistance system configured to travel autonomously or assist a driver.

The vehicle 100 includes, for example, an external information detection device 110, a vehicle information detection device 120, a position information detection device 130, and a vehicle control apparatus 140. Although not illustrated, the vehicle 100 also includes a power source such as an engine or a motor, a power transmission mechanism that transmits power from the power source to wheels, a steering mechanism that controls a steering angle of the vehicle 100, and a braking mechanism flat brakes the vehicle. Although not illustrated, the vehicle 100 also includes various actuators that automatically operate the power source, the power transmission mechanism, the steering mechanism, the braking mechanism, and the like, a display device, and an input device such as a touch panel.

The external information detection device 110 includes, for example, an imaging device, a LiDAR, a millimeter wave radar, an ultrasonic sensor, and the like. The imaging device includes, for example, a stereo camera, a monocular camera, and the like. The vehicle information detection device 120 includes, for example, a speed sensor, an acceleration sensor, an angular velocity sensor, a steering angle sensor, an accelerator sensor, a brake sensor, a gear position sensor, and the like. The position information detection device 130 includes, for example, a satellite positioning system such as a global navigation satellite system (GNSS), an acceleration sensor, an inertial sensor, and the like.

The vehicle control apparatus 140 is a microcontroller or firmware including, for example, a central processing device 141 and a storage device 142 such as a RAM or a ROM, as well as timer and an input/output device (not illustrated). For example, the vehicle control apparatus 140 outputs control signals to the various actuators of the vehicle 100 to automatically operate the power source, the power transmission mechanism, the steering mechanism, the braking mechanism, and the like, thereby realizing automated driving of the vehicle 100 or advanced driver assistance.

Figure 2:
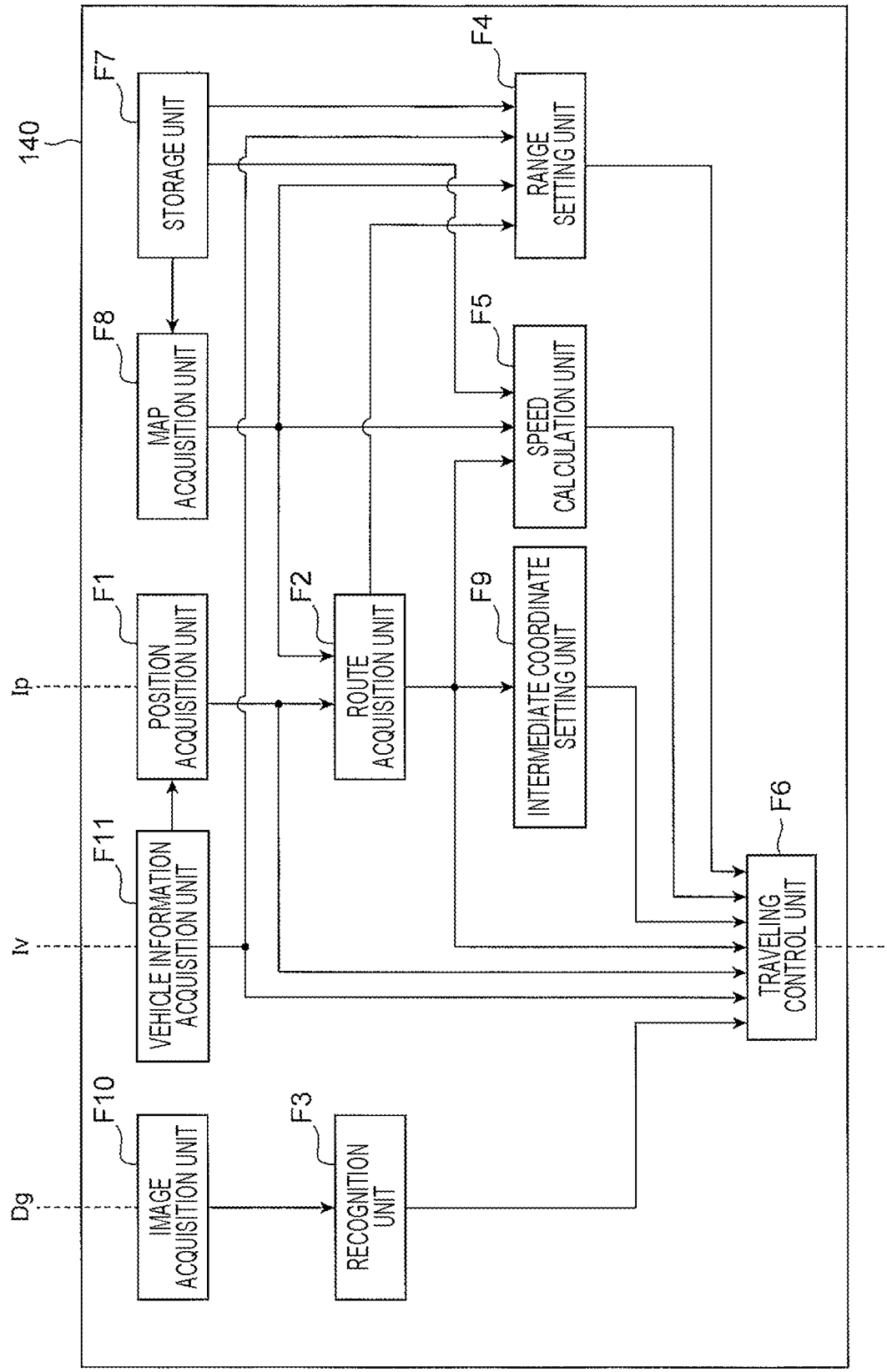
FIG. 2 is a functional block diagram of the vehicle control apparatus in FIG. 1.

FIG. 2 is a functional block diagram of the vehicle control apparatus 140 in FIG. 1. Although details will be described later, the vehicle control apparatus 140 of the present embodiment has a following configuration as a main feature. The vehicle control apparatus 140 is mounted on the vehicle 100 to be controlled, and includes a position acquisition unit F1, route acquisition unit F2, a recognition unit F3, range setting unit F4, a speed calculation unit F5, and a traveling control unit F6.

In the example shown in FIG. 2, the vehicle control apparatus 140 also includes, for example, a storage unit F7, a map acquisition unit F8, an intermediate coordinate setting unit F9, an image acquisition unit F10, and a vehicle information acquisition unit F11. Each unit of the vehicle control apparatus 140 shown in FIG. 2 indicates a function of the vehicle control apparatus 140 realized by, for example, the central processing device 141 executing a program stored in the storage device 142 shown in FIG. 1. The image acquisition unit F10 acquires image data Dg from, for example, the imaging device included in the external information detection device 110.

The recognition unit F3 recognizes a stop condition included in the image data Dg acquired by the image acquisition unit F10, and outputs a recognition result to the traveling control unit F6. The stop condition included in the image data Dg is, for example, a red or yellow light color of a traffic light, or lighting of a railroad crossing alarm or a closed state of a railroad crossing gate. The recognition unit F3 performs, for example, a traffic light color recognition process on an area in the image data Dg acquired from the image acquisition unit F10, the area including a red or yellow light color of a traffic light or lighting of a railroad crossing as the stop condition. The recognition unit F3 outputs a determination result of the traffic light color recognition process to the traveling control unit F6.

Furthermore, the recognition unit F3 performs, for example, pattern matching of a railroad crossing gate that is the stop condition on the image data Dg acquired from the imago acquisition unit F10, and outputs a result of the pattern matching to the traveling control unit F6. When the external information detection device 110 of the vehicle 100 incudes a sound detection device such as a microphone, the recognition unit F3 may recognize the stop condition based on an alarm sound included in sound information input from the external information detection device 110 to the vehicle control apparatus 140 and the image data Dg acquired from the image acquisition unit F10. The recognition unit F3 may also recognize, for example, an obstacle, a road marking, a road sign, and the like around the vehicle 100 based on the image data Dg, and output a recognition result to the traveling control unit F6.

The vehicle information acquisition unit F11 acquires vehicle information Iv output from, for example, the vehicle information detection device 120, and outputs the vehicle information Iv to the range setting unit F4 and the traveling control unit F6. The vehicle information Iv includes, for example, a speed, an acceleration, an angular velocity, a steering angle, an attitude angle, an accelerator operation amount, a brake operation amount, a gear position, and the like of the vehicle 100. The vehicle information acquisition unit F11 may output the acceleration and the angular velocity of the vehicle 100 acquired from, for example, the acceleration sensor and the angular velocity sensor included in the vehicle information detection device 120 to the position acquisition unit F1.

The position acquisition unit F1 acquires the position of the vehicle 100, that is, position information Ip output from, for example, the position information detection device 130. The position information Ip includes, for example, coordinates of the vehicle 100 in the WGS84 coordinate system. The position acquisition unit F1 also acquires an origin for calculating the position of the vehicle 100 previously stored in, for example, the storage device 142.

The storage unit F7 stores, for example, map information and specifications of the imaging device. The map information includes position information and the like of, for example, a road (link), an intersection (node), a lane, a gradient (road surface slope information), an obstacle, a building, and a traffic light and a railroad crossing that may cause the stop condition. The specifications of the imaging device include, for example, an installation position of the imaging device in the vehicle 100, an installation angle, an angle of view, the number of pixels, sensitivity, an image-capturable distance, and the like. The storage unit F7 also stores, tor example, a set value of acceleration during deceleration of the vehicle 100. For example, the map information, the specifications of the imaging device, and the set value of acceleration are input to the vehicle control apparatus 140 via the input/output device, and are stored in the storage device 142 constituting the storage unit F7.

For example, the map acquisition unit F8 acquires the map information from the storage unit F7, and outputs the map information to the route acquisition unit F2, the range setting unit F4, and the speed calculation unit F5. The route acquisition unit F2 acquires a planned route of the vehicle 100. Specifically, the route acquisition unit F2 calculates a route of the vehicle 100 from a departure point to a destination point, for example, based on the position of the vehicle 100 input from the position acquisition unit F1, the map information input from the map acquisition unit F8, and the destination point input to the vehicle control apparatus 140 via the input/output device.

The range setting unit F4 sets a recognizable range for the stop condition in the planned route acquired by the route acquisition unit F2. Here, the stop condition is, for example, a red or yellow light color of a traffic light, or lighting of a railroad crossing alarm or a closed state of a railroad crossing gate. Furthermore, the recognizable range is, for example, a range in which the recognition unit F3 can recognize the stop condition in the image data Dg of the stop condition captured by the imaging device included in the external information detection device 110, the image data Dg being acquired by the image acquisition units F10. More specifically, the recognizable range is defined by, for example, a distance from an object of the stop condition to the imaging device, the road surface slope information, and the attitude angle of the vehicle 100. This recognizable range may vary depending on environment around the vehicle 100 such as brightness, contrast, backlight, and weather conditions.

The range setting unit F4 can set the recognizable range, for example, based on map information acquired from the map acquisition unit F8, the specifications of the imaging device acquired from the storage unit F7, and the attitude angle of the vehicle 100 acquired from the vehicle information acquisition unit F11. Here, the map information includes, for example, road information, the position information of an object of the stop condition, that is, a traffic light, a railroad crossing, or the like, and the road surface slope information included in the travel route of the vehicle 100. As described above, the specifications of the imaging device include, for example, the installation position of the imaging device in the vehicle 100, the installation angle, the angle of view, the number of pixels, the sensitivity, the image-capturable distance, and the like.

The range setting unit F4 may set the recognizable range, for example, based on a recognition time of the recognition unit F3 in addition to the map information and the specifications of the imaging device described above. Here, the recognition time of the recognition unit F3 is a time required for the recognition unit F3 to recognize the stop condition such as a red or yellow light color of traffic light in the image data, and is, for example, previously stored in the storage unit F7. In this case, the range setting unit F4 can acquire the recognition time of the recognition unit F3 from the storage unit F7.

The speed calculation unit F5 calculates a braking speed of the vehicle 100, the braking speed allowing the vehicle to stop at a stop position corresponding to the stop condition without the acceleration of the vehicle 100 during deceleration exceeding the set value.

The set value of acceleration during deceleration, that is, the set value of deceleration of the vehicle 100 can be set to a numerical value such that an occupant of the vehicle 100 is safe and feels no discomfort and anxiety, for example, 0.3 [G], 0.2 [G], 0.1 [G], and so on. The stop position corresponding to the stop condition is, for example, when art object of the stop condition is a traffic light or a railroad crossing, a position short of stop line before the traffic light or the railroad crossing.

The intermediate coordinate setting unit F9 sets a plurality of intermediate coordinates on the planned route acquired by the route acquisition unit F2. For example, the intermediate coordinate setting unit F9 sets the intermediate coordinates on the planned route of the vehicle 100 at intervals previously set and stored in the storage device 142, and stores the set intermediate coordinates in the storage device 142.

The traveling control unit F4 receives, for example, the recognition results for the image data Dg from the recognition unit F3, the vehicle information from the vehicle information acquisition unit F11, the position of the vehicle 100 from the position acquisition unit F1, and the planned route of the vehicle 100 from the route acquisition unit F2. Furthermore, the traveling control unit F6 receives the intermediate coordinates on the planned route from the intermediate coordinate setting unit F9, the braking speed of the vehicle 100 from the speed calculation unit F5, and the recognizable range from the range setting unit F4.

As described above, the braking speed of the vehicle 100 is a speed of the vehicle 100 allowing the vehicle to stop at a stop position corresponding to the stop condition without the acceleration of the vehicle 100 during deceleration exceeding the set value. As described above, the recognizable range is a range in which the recognition unit F3 can recognize the stop condition in the planned route of the vehicle 100 cased on the image data Dg acquired from the image acquisition unit F10.

The traveling control unit F6 outputs control signals to the various actuators of the vehicle 100 to control the vehicle 100, for example, based on the input information, and causes the vehicle 100 to autonomously travel to the destination point. In addition, the traveling control unit F6 controls the speed of the vehicle 100 to the braking speed when the position of the vehicle 100 is included in the recognizable range for the stop condition and the recognition unit F3 fails to recognize the stop condition.

Figure 3:
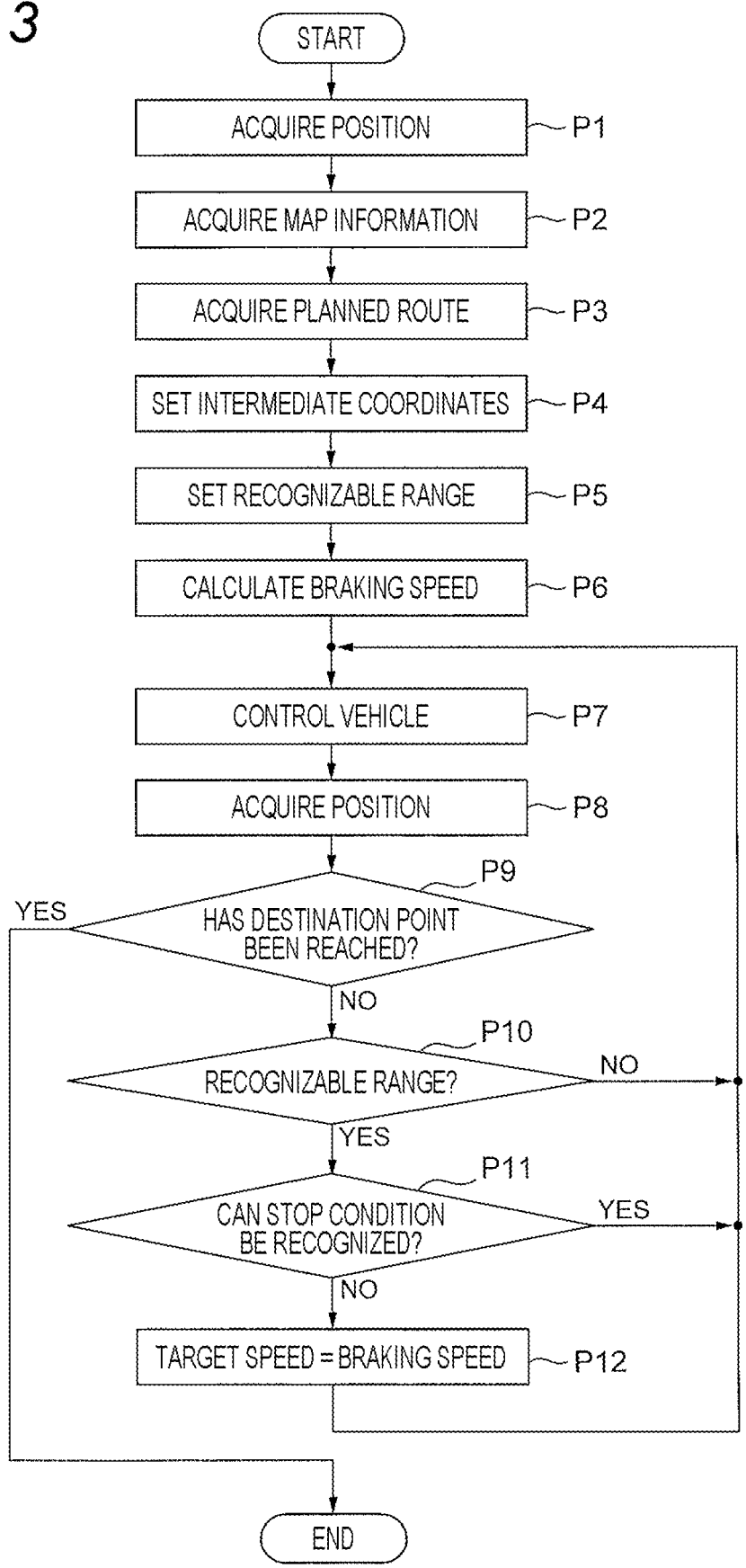
FIG. 3 is a flowchart for explaining operation of the vehicle control apparatus in FIG. 2.
Figure 4:
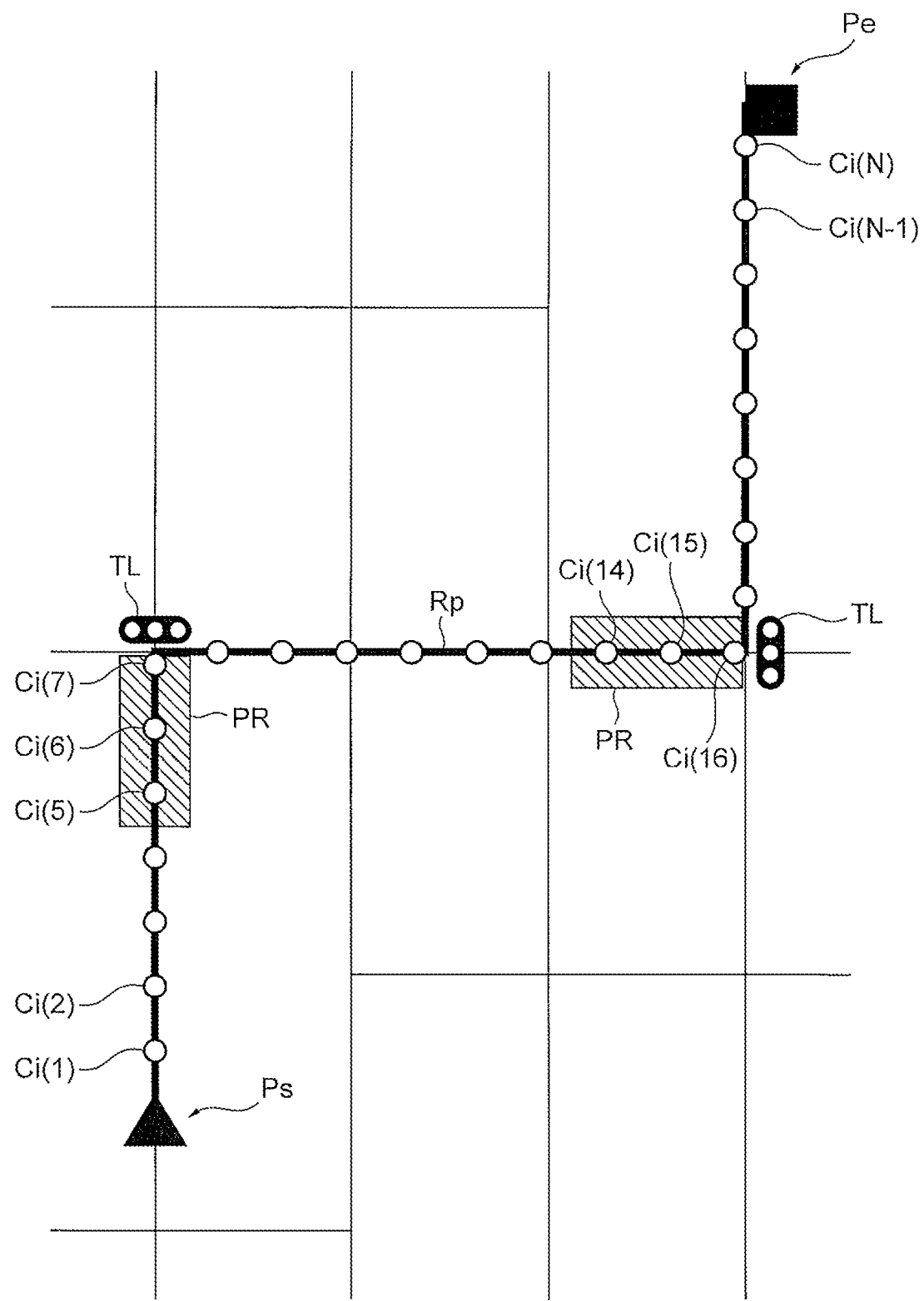
FIG. 4 is a map for explaining processing in FIG. 3 from a start to a recognizable range setting process.

Next, operation of the vehicle control apparatus 140 of the present embodiment will be described. FIG. 3 is a flowchart for explaining an example of the operation of the vehicle control apparatus in FIG. 2. FIG. 4 is a map example for explaining processing in FIG. 3 from a start to a recognizable range setting process P5.

There is described an example in which the vehicle control apparatus 140 causes the vehicle 100 in FIG. 1 to travel from a departure point Ps to a destination point Pe in FIG. 4 by automated driving. For example, when starting control of the vehicle 100 as shown in FIG. 3, the vehicle control apparatus 140 executes a process P1 of acquiring the position of the vehicle 100 by the position acquisition unit F1, and a process P2 of acquiring the map information around the vehicle 100 by the map acquisition unit F8.

Here, for example, as illustrated in FIG. 4, a person in the vehicle 100 inputs the destination point Pe of the vehicle 100 using a map displayed on the display device and the touch panel mounted on the vehicle 100, a smartphone connected to the vehicle control apparatus 140 via a radio communication channel, or the Like. The vehicle control apparatus 140 executes a process P3 of acquiring a planned route Pp from the departure point Ps that is the present position of the vehicle 100 to the destination point Pe by, for example, the route acquisition unit F2.

Next, the vehicle control apparatus 140 executes process P4 of setting a plurality of intermediate coordinates $Ci(1)$, $Ci(2)$, $Ci(3)$, ... $Ci(N-1)$, $Ci(N)$ on the planned route Rp by, for example, the intermediate coordinate setting unit F9. Next, the vehicle control apparatus 140 executes a process P5 of setting a recognizable range PR for a stop condition in the planned route Rp. In the example illustrated in FIG. 4, the stop condition is a red or yellow light color of a traffic light TL. As described above, the stop condition may be another condition such as lighting of a railroad crossing alarm or a closed state of a railroad crossing gate.

FIG. 6 is a graph for explaining a process P6 of calculating a braking speed in FIG. 3. In the graph of FIG. 6, the horizontal axis represents a remaining distance to a stop position [m] of the vehicle 100, and the vertical axis represents the speed [km/h] of the vehicle 100. A curve C is expressed by $V=(2ad)^{1/2}$ when the speed of the vehicle 100 is V, the remaining distance to the stop position is d, and the set value of acceleration during deceleration, that is, the set value of deceleration of the vehicle 100 is a [G].

Figure 5:
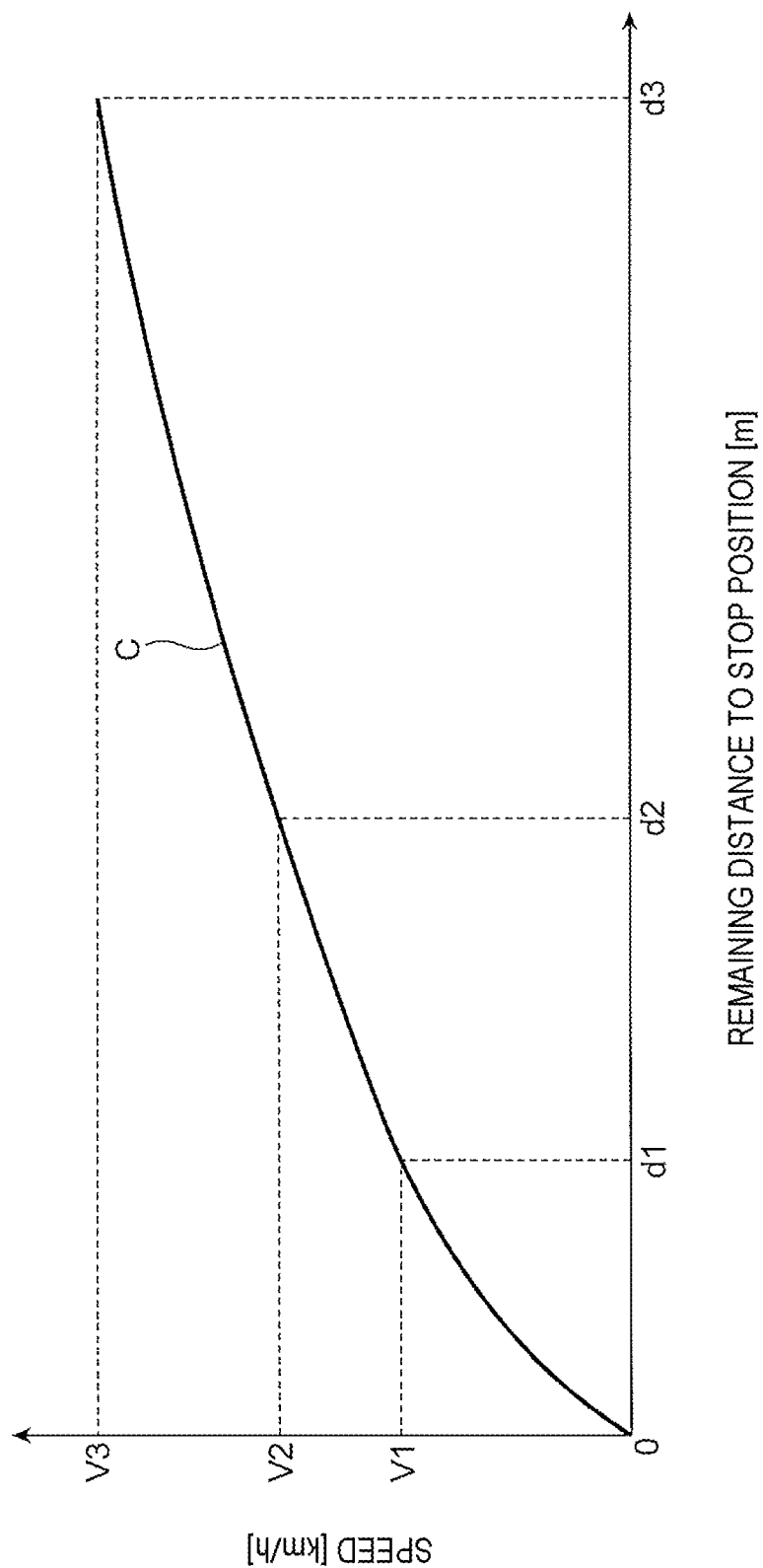
FIG. 5 is a graph for explaining a braking speed calculation process in FIG. 3.

The vehicle control apparatus 140 executes the process P6 of calculating a braking speed of the vehicle 100 in FIG. 3 by, for example, the speed calculation unit F5. Here, as described above, the braking speed is a speed of the vehicle 100 allowing the vehicle 100 to stop at a stop position corresponding to the stop condition without the acceleration of the vehicle 100 during deceleration exceeding the set value. More specifically, for example, as shown in FIG. 5, the braking speed is V3 [km/h] or less when the remaining distance is d3 [m], V2 [km/h] or less when the remaining distance is d2 [m], and V1 [km/h] or less when the remaining distance is d1 [m]. The speed calculation unit F5 calculates the braking speed, for example, based on the curve C in FIG. 5, the remaining distance to a stop position, and a speed limit on a road.

The vehicle control apparatus 140 may calculate the braking speed only for, for example, the recognizable range PR on the planned route Rp. When the intermediate coordinates Ci are set on the planned route Rp, the vehicle control apparatus 140 may calculate the braking speed only for the intermediate coordinates Ci(5), Ci(6), Ci(7), Ci(14), Ci(15), and Ci(16) included in the recognizable range PR.

Next, the vehicle control apparatus 140 executes a process P7 of controlling the vehicle 100 by the traveling control unit F6 outputting control signals to the various actuators of the vehicle 100, and causes the vehicle 100 to autonomously travel to the destination point Pe. Here, the vehicle control apparatus 140 calculates a target speed at each intermediate coordinate Ci by, for example, the traveling control unit F6, and causes the vehicle 100 to autonomously travel at the target speed in accordance with the speed limit on the road included in the recognizable range PR. During the automatic traveling of the vehicle 100, the vehicle control apparatus 140 executes a process P8 of acquiring the position of the vehicle 100 by the position acquisition unit F1 with a predetermined period.

In addition, the vehicle control apparatus 140 executes a determination process P9 of determining whether the vehicle 100 has reached the destination point Pe by the traveling control unit F6 with the predetermined period. When determining that the destination point Pe has not been reached (NO) in the determination process P9, the vehicle control apparatus 140 further executes a determination process P10 of determining whether the position of the vehicle 100 is included in the recognizable range PR by the traveling control unit F6. When determining that the position of the vehicle 100 is not included in the recognizable range PP (NO) by the traveling control unit F6 in the determination process P10, the vehicle control apparatus 140 repeatedly executes the processing from the process P7 to the determination process P10 with the predetermined period until the vehicle reaches the destination point Pe.

As illustrated in FIG. 4, the vehicle 100, which has starred automated driving from the departure point Ps, travels along the planned route Rp and enters the recognizable range PP for a traffic light TL. Then, in the determination process P10, the vehicle control apparatus 140 determines that the position of the vehicle 100 is included in the recognizable range PR (YES) by the traveling control unit F6, and further executes a determination process P11 of determining whether the recognition unit F3 can recognize the stop condition.

When the imaging device included in the external information detection device 110 of the vehicle 100 that has entered the recognizable range PR can capture the traffic light TL, the image acquisition unit F10 acquires the image data Dg from the imaging device. Furthermore, the recognition unit F3 acquires the image data Dg from the image acquisition unit F10. When the recognition unit F3 recognizes a light color of the traffic light TL that is the stop condition, the traveling control unit F6 determines that the stop condition can be recognized (YES) in the determination process P11. In this case, the vehicle control apparatus 140 returns to the process P7, executes vehicle control by the traveling control unit F6 according to the light color of the traffic light TL recognized by the recognition unit F3, and executes again the processing after the process P8.

On the other hand, there may be, for example, a large vehicle such as a truck traveling in front of the vehicle 100 that has entered the recognizable range PR, a roadside tree that blocks a field of view of the imaging device, or a slope, an overpass, a curve, a tunnel, or the like before the traffic light TL. In such a case, the imaging device fails to capture the object of the stop condition such as the traffic light TL, and the recognition unit F3 also fails to recognize the stop condition. Even when the imaging device can capture the object of the stop condition, the recognition unit F3 may fail to recognize the stop condition due to external environment around the vehicle 100 such as rain, snow, or backlight.

In such a case, the vehicle control apparatus 140 determines that the recognition unit F3 cannot recognize the stop condition (NO) by the traveling control unit F6 in the determination process P11, and executes a process P12 of setting an upper limit value of the target speed of the vehicle 100 in the automated driving to the braking speed calculated in the process P6. Then, the vehicle control apparatus 140 returns to the process P7, causes the vehicle 100 to travel at a speed equal to or lower than the braking speed by the traveling control unit F6, and executes again the processing after the process P8 of acquiring the position of the vehicle 100 by the position acquisition unit F1.

Thereafter, when, for example, the track that blocks the field of view of the imaging device moves and the stop condition becomes recognizable by the recognition unit F3 in the recognizable range PR, the traveling control unit F6 determines that the stop condition can be recognized (YES) in the determination process P11, and the processing returns to the process P7. At this time, it is assumed that the light color of the traffic light TL is yellow or red. In this case, according to the light color of the traffic light TL, the traveling control unit F6 brakes the vehicle 100 traveling at the speed equal to or lower than the braking speed to stop the vehicle 100 at the stop position corresponding to the stop condition, for example, immediately before a stop line before the traffic light TL.

In this way, the vehicle control apparatus 140 causes the vehicle 160 to travel at the braking speed at the start of braking of the vehicle 100. As described above, the braking speed is a speed allowing the vehicle 100 to stop at a stop position corresponding to the stop condition without the acceleration of the vehicle 100 during deceleration exceeding the set value. Therefore, even in the case of failure to recognize the stop condition in the recognizable range PR, the vehicle control apparatus 140 can prevent sudden deceleration of the vehicle 100, and stop the vehicle 100 at a predetermined stop position in such a manner that a person in the vehicle is kept safe and feels no discomfort and anxiety.

Thereafter, the vehicle control apparatus 140 causes the vehicle 100 to travel along the planned route Rp by the traveling control unit F6, and the vehicle 100 reaches the destination point Pe. Then, the traveling control unit determines that the vehicle 100 has reached the destination point Pe (YES) in the determination process P9, and the processing in FIG. 3 ends.

As described above, a vehicle control apparatus 140 of the present embodiment is mounted on a vehicle 100 including an imaging device. The vehicle control apparatus 140 includes a position acquisition unit F1 configured to acquire a position of the vehicle 100, a route acquisition unit F2 configured to acquire a planned route Rp of the vehicle 100, and a recognition unit F3 configured to recognize a stop condition included in image data from the imaging device. The vehicle control apparatus 140 also includes a range setting unit F4 configured to set a recognizable range PR for the stop condition in the planned route Rp, and a speed calculation unit F5 configured to calculate a braking speed of the vehicle 100, the braking speed allowing the vehicle 100 to stop at a stop position corresponding to the stop condition without an acceleration of the vehicle 100 during deceleration exceeding a set value.

In addition, the vehicle control apparatus 140 includes a traveling control unit F6 configured to control a speed of the vehicle 100 to the braking speed when the position of the vehicle 100 is included in the recognizable range PR and the recognition unit F3 fails to recognize the stop condition.

Such a configuration allows the vehicle control apparatus 140 of the present embodiment to prevent sudden deceleration of the vehicle 100 to be controlled even in the case of failure to recognize the stop condition at predetermined position. More specifically, as described above, in the recognizable range PR, the vehicle control apparatus 140 controls the speed of the vehicle 100 to the braking speed in the case of failure to recognize a red or yellow light color of a traffic light TL, or lighting of a railroad crossing alarm or a closed state of a railroad crossing gate as the stop condition. As described above, the braking speed is a speed allowing the vehicle 100 to stop at the stop position corresponding to the stop condition without the acceleration of the vehicle 100 during deceleration exceeding the value. Therefore, as described above, according to the vehicle control apparatus 140 of the present embodiment, it is possible to prevent sudden deceleration of the vehicle 100 and to stop the vehicle 100 at a predetermined stop position in such a manner that a person in the vehicle is kept safe and feels no discomfort and anxiety even in the case of failure to recognize the stop condition in the recognizable range PR.

The vehicle control method of the present embodiment is a method for controlling a vehicle 100 including an imaging device and the vehicle control apparatus 140. The vehicle control method of the present embodiment includes acquiring a position and a planned route Rp of the vehicle 100, recognizing a stop condition included in image data from the imaging device, and setting a recognizable range PR for the stop condition in the planned route Rp. The vehicle control method of the present embodiment also includes calculating a braking speed of the vehicle 100, the braking speed allowing the vehicle 100 to stop at a stop position corresponding to the stop condition without an acceleration of the vehicle 100 during deceleration exceeding a set value. In addition, the vehicle control method of the present embodiment includes controlling a speed of the vehicle 100 to the braking speed when the position of the vehicle 100 is included in the recognizable range PR and the stop condition fails to be recognized. The control method of the present embodiment can also achieve advantageous effects similar to those of the vehicle control apparatus 140 of the present embodiment.

The program of the present embodiment is a program for controlling a vehicle 100 including an imaging device and the vehicle control apparatus 140. The program of the present embodiment causes the vehicle control apparatus 140 to execute the following processes: a process P1 of acquiring a position of the vehicle 100; a process P3 of acquiring a planned route Rp of the vehicle 100; a process P11 of recognizing a stop condition included in image data from the imaging device; a process P5 of setting a recognizable range PR for the stop condition in the planned route Rp; a process P6, of calculating a braking speed of the vehicle 100, the braking speed allowing the vehicle 100 to stop at a stop position corresponding to the stop condition without an acceleration of the vehicle 100 during deceleration exceeding a set value; and a process P12 of controlling a speed of the vehicle 100 to the braking speed when the position of the vehicle 100 is included in the recognizable range FR and the stop condition fails to be recognized. The program of the present embodiment can also achieve advantageous effects similar to those of the vehicle control apparatus 140 of the present embodiment.

The vehicle control apparatus 140 of the present embodiment further includes a storage unit F7 that stores map information and specifications of the imaging device, and a map acquisition unit configured to acquire the map information. In addition, the range setting unit F4 is configured to set the recognizable range PR based on the map information and the specifications of the imaging device. Such a configuration allows the vehicle control apparatus 140 of the present embodiment to set the recognizable range PR based on the map information and the specifications of the imaging device before starting automated driving of the vehicle 100, and to more reliably prevent sudden deceleration and sudden stop during autonomous traveling of the vehicle 100.

In the vehicle control apparatus 140 of the present embodiment, the storage unit F7 stores a recognition time required for the recognition unit F3 to recognize the stop condition. Then, the range setting unit F4 is configured to set the recognizable range PR further based on the recognition time. Such a configuration allows the vehicle control apparatus 140 of the present embodiment to set the recognizable range PR in consideration of the recognition time for the recognition unit F3, and to more reliably prevent sudden deceleration and sudden stop during the autonomous traveling of the vehicle 100.

Note that the recognition time for the recognition unit F3 changes depending on the specifications of the imaging device, a size of a traffic light TL, and the like. For this reason, the recognition time for the recognition unit F3 may be parameterized based on various conditions, and past recognition time may be accumulated in the storage unit F7. Then, the recognition time may be dynamically and predictively obtained by statistical processing or machine learning.

In the vehicle control apparatus 140 of the present embodiment, the storage unit F7 also stores the set value of acceleration during deceleration of the vehicle 100.

This configuration allows the vehicle control apparatus 140 to acquire the set value of acceleration during deceleration of the vehicle 100 from the storage unit F7 when calculating the braking speed of the vehicle 100 by the speed calculation unit F5. In addition, an appropriate set value of acceleration during deceleration of the vehicle 100 can be previously stored in the storage unit F7.

The vehicle control apparatus 140 of the present embodiment further includes an intermediate coordinate setting unit F9 configured to set a plurality of intermediate coordinates Ci on the planned route Rp. Then, the speed calculation unit F5 is configured to calculate the braking speed at an intermediate coordinate included in the recognizable range PR of the intermediate coordinates Ci. Such a configuration allows the vehicle control apparatus 140 of the present embodiment to reduce a calculation amount and to shorten processing time. Note that, in this case, the traveling control unit F6 may parameterize the number of times of acceleration/deceleration, magnitude of acceleration and deceleration, time to reach a target speed, and the like for grading to avoid repeating deceleration of the vehicle 100 in a short time, and may perform vehicle control based on bodily sensation of a person in the vehicle 100.

In the vehicle control apparatus 140 of the present embodiment, the stop condition included in the image data from the imaging device is, for example, a red or yellow light color of a traffic light. This configuration allows for preventing sudden deceleration and sudden stop of the vehicle 100 even when the recognition unit F3 of the vehicle control apparatus 140 fails to recognize the light color of a traffic light due to influence of external environment around the vehicle 100 during automated driving of the vehicle 100.

In the vehicle control apparatus 140 of the present embodiment, the stop condition included in the image data from the imaging device is, for example, lighting of a railroad crossing alarm or a closed state of a railroad crossing gate. This configuration allows for preventing sudden deceleration and sudden stop of the vehicle 100 even when the recognition unit F3 of the vehicle control apparatus 140 fails to recognize a railroad crossing alarm or a railroad crossing gate due to influence of external environment around the vehicle 100 during automated driving of the vehicle 100.

In the vehicle control apparatus 140 of the present embodiment, the recognition unit F3 may recognize the stop condition based on the image data Dg and an alarm sound. This allows the recognition unit F3 to more reliably recognize the stop condition of a railroad crossing alarm to more reliably prevent sudden deceleration and sudden stop of the vehicle 100.

Although the embodiment of the vehicle control apparatus according to the present disclosure is described above in detail with reference to the drawings, the specific configuration is not limited to this embodiment. Design changes and the like without departing from the gist of the present disclosure are included in the present disclosure.

REFERENCE SIGNS LIST 100 vehicle
110 external information detection device (imaging device)
140 vehicle control apparatus
Ci intermediate coordinate
Dg image data
F1 position acquisition unit
F2 route acquisition unit
F3 recognition unit
F4 range setting unit
F5 speed calculation unit
F6 traveling control unit
F7 storage unit
F8 map acquisition unit
F9 intermediate coordinate setting unit
PR recognizable range
Rp planned route
TL traffic light

The invention claimed is:

1. A vehicle control apparatus mounted on a vehicle including an imaging device, the vehicle control apparatus comprising:
 a position acquisition unit configured to acquire a position of the vehicle;
 a route acquisition unit configured to acquire a planned route of the vehicle;
 a recognition unit configured to recognize a stop condition included in image data from the imaging device;
 an intermediate coordinate setting unit configured to set a plurality of intermediate coordinates on the planned route;
 a range setting unit configured to set a recognizable range for the stop condition in the planned route, based at least in part on the plurality of intermediate coordinates;
 a speed calculation unit configured to calculate a braking speed of the vehicle at one or more of the plurality of intermediate coordinates, the braking speed allowing the vehicle to stop at a stop position corresponding to the stop condition without an acceleration of the vehicle during deceleration exceeding a set value; and
 a traveling control unit configured to control a speed of the vehicle to the braking speed at the one or more of the plurality of intermediate coordinates when the position of the vehicle is included in the recognizable range and the recognition unit fails to recognize the stop condition.

2. The vehicle control apparatus according to claim 1, further comprising a storage unit that stores map information and specifications of the imaging device, and a map acquisition unit configured to acquire the map information, wherein
 the range setting unit is configured to set the recognizable range based on the map information and the specifications.

3. The vehicle control apparatus according to claim 2, wherein the storage unit stores a recognition time required for the recognition unit to recognize the stop condition, and
 the range setting unit is configured to set the recognizable range further based on the recognition time.

4. The vehicle control apparatus according to claim 2, wherein the storage unit stores the set value.

5. The vehicle control apparatus according to claim 1, wherein the stop condition is a red or yellow light color of a traffic light.

6. The vehicle control apparatus according to claim 1, wherein the stop condition is lighting of a railroad crossing alarm or a closed state of a railroad crossing gate.

7. The vehicle control apparatus according to claim 6, wherein the recognition unit is configured to recognize the stop condition based on the image data and an alarm sound.

8. A vehicle control method for controlling a vehicle including an imaging device, the vehicle control method comprising:
 acquiring a position and a planned route of the vehicle;
 recognizing a stop condition included in image data from the imaging device;
 setting a plurality of intermediate coordinates on the planned route;
 setting a recognizable range for the stop condition in the planned route, based at least in part on the plurality of intermediate coordinates;
 calculating a braking speed of the vehicle at one or more of the plurality of intermediate coordinates, the braking speed allowing the vehicle to stop at a stop position corresponding to the stop condition without an acceleration of the vehicle during deceleration exceeding a set value; and
 controlling a speed of the vehicle to the braking speed at the one or more of the plurality of intermediate coordinates when the position of the vehicle is included in the recognizable range and the stop condition fails to be recognized.

9. A program for controlling a vehicle including an imaging device and a vehicle control apparatus, the program causing the vehicle control apparatus to execute:
 a process of acquiring a position of the vehicle;
 a process of acquiring a planned route of the vehicle;
 a process of recognizing a stop condition included in image data from the imaging device;
 a process of setting a plurality of intermediate coordinates on the planned route;
 a process of setting a recognizable range for the stop condition in the planned route, based at least in part on the plurality of intermediate coordinates;

a process of calculating a braking speed of the vehicle at one or more of the plurality of intermediate coordinates, the braking speed allowing the vehicle to stop at a stop position corresponding to the stop condition without an acceleration of the vehicle during deceleration exceeding a set value; and a process of controlling a speed of the vehicle to the braking speed at the one or more of the plurality of intermediate coordinates when the position of the vehicle is included in the recognizable range and the stop condition fails to be recognized.

* * * * *